(No Model.)

J. HOWARD.
LOAD INDICATOR FOR VEHICLES.

No. 388,874. Patented Sept. 4, 1888.

WITNESSES:
Gustave Dieterich
W. A. C. Matthies

INVENTOR.
Jas. Howard

United States Patent Office.

JAMES HOWARD, OF NEW YORK, N. Y.

LOAD-INDICATOR FOR VEHICLES.

SPECIFICATION forming part of Letters Patent No. 388,874, dated September 4, 1888.

Application filed February 16, 1887. Renewed December 14, 1887. Serial No. 257,827. (No model.)

*To all whom it may concern:*

Be it known that I, JAMES HOWARD, a subject of Her Majesty the Queen of Great Britain, and at present residing at New York, in the county and State of New York, have invented certain new and useful Improvements in Load-Indicators, of which the following is a specification.

The load-indicator is intended to be used upon vehicles—such as road-wagons, trolleys, tram-cars, and railroad-cars—for the purpose of indicating the weight of the load being put into them and designating when the proper capacity of the vehicle has been reached.

The load-indicator consists of a combined index-finger and balanced lever with a graduated scale and an adjustable rod, having preferably a curved foot for operating the index-finger and a lid or cover to protect it from the weather, with incidental features, all as hereinafter more fully described.

I make my load-indicator of any suitable material and attach it to the upper and lower spring-beams of any vehicle, wagon, trolley, tram-car, or railroad-car in any convenient position where the motion of the spring-beam can be obtained, as I make use of the motion of the spring beam to operate the indicator, all of which may be better understood by reference to the accompanying drawings, where I show the indicator attached to the spring-beams of a railroad-truck, and in which like letters denote like parts.

Figure 1 is an end view of the spring-beams of a freight-car truck, showing the indicator A A attached to the spring-beams W S. B is the adjustable rod which operates the combined index-finger and balanced lever C, which is pivoted at D, and moves on the graduated scale F. R is the retaining-spring for holding the index-finger when not in use. H H are set-nuts for the adjustable rod B, which enables it to be raised or lowered in the slot G of the sleeve *a*, as required. E is a hole to admit the rod B, as shown more clearly in Fig. 2. The cover L protects the index-finger from the weather.

Figure 1:
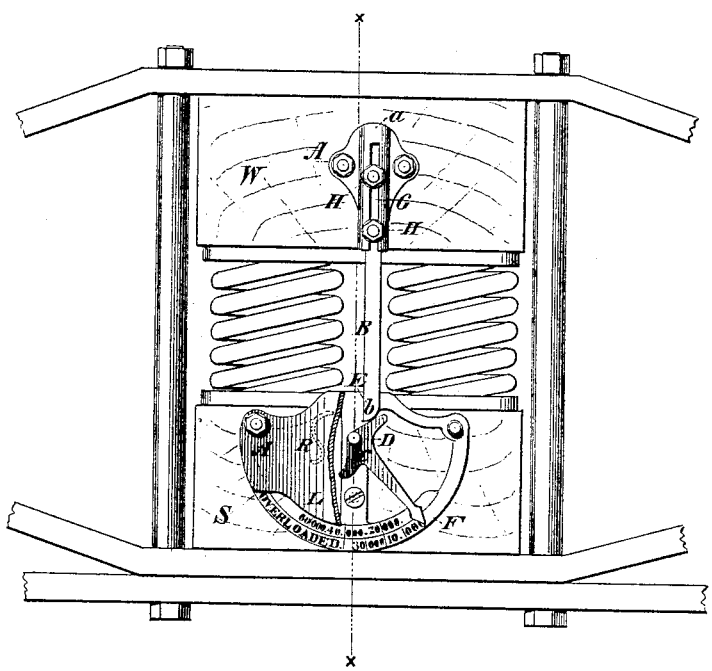
Figure 2:
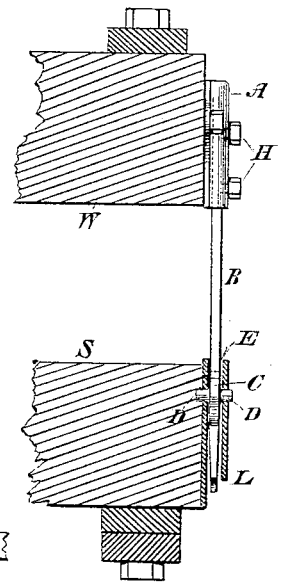
Fig. 2 is a side view of the load-indicator, partly in section, showing the rod B in the hole E and the two pivots D D of the index-finger C.
Figure 3:
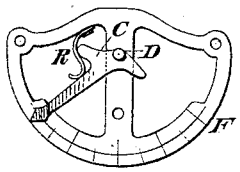
Fig. 3 shows part of the indicator with the lid removed and the retaining-spring R holding the index-finger C.

The operation of the indicator on railroad-cars is as follows: When a car is left at a siding to be loaded, the conductor or brakeman must release the index-finger from the spring R, so that it may move freely on its pivots D D as an axis. The index-finger C being released from the spring R by pulling it aside, it immediately falls into operative position. The weight of the loaded car comes upon the spring-beam W and forces it downward, carrying with it the rod B, which moves the index-finger C along the graduated scale F, which displays the number of tons the car is marked to carry. As soon as the maximum load is reached, the index-finger shows it at once upon the scale and will at once indicate if the car is overloaded and to what extent. When the loaded car is coupled to the train, the brakeman should push the index-finger onto the retaining-spring. If, however, he should neglect to do this, the spring is so arranged that at the first bad joint the car passes over the spring will catch the finger and so prevent its further shaking about and wearing the pivots unnecessarily.

It is obvious that this arrangement may be modified to suit any kind of vehicle, wagon, trolley, tram-car, truck, or machine, where springs and spring-beams are used and weight is to be indicated. For instance, it might be modified by placing an index-finger on the moving spring-beam and a scale on the pedestal, or vice versa; but the movement of the spring-beam is so small as the springs become compressed by the load that confusion might easily arise. To avoid this it will be seen that in the combination shown the index-finger C is so constructed and arranged that as the compression of the springs grows less by the weight of the load the leverage on the index-finger is shortened by means of the curved toe *b* of the rod B, which results in a greater movement of the index-finger as the load increases, the movement commencing, say, at three to one and increasing to twelve to one, thus pointing out very clearly when the car is overloaded as well as the extent of such overloading. Should a spring break and let the rod B down, it merely pushes the index-finger aside and does not injure the indicator. As soon as the rod B is lifted to its plane, the index-finger falls into position by gravitation, being weighted for the purpose. I may however, use a spring pressing against the left-hand side of the index-finger to accomplish this result, if preferred.

If the vehicle-springs take a "set," the rod B can be adjusted when the car is on the weight-scales by means of the set-nuts H H, so that the load will still be correctly indicated.

The indicator is more especially adapted to railway traffic, where cars are left to be loaded at way-stations where there are no weight-scales. These cars are often so overloaded as to do great damage to the cars themselves, to say nothing of the danger of accident to life and limb caused by such overloading.

Having thus described my invention, what I claim as new, and desire to obtain Letters Patent for, is—

1. The combination of the adjustable rod B with the combined index-finger and balanced lever C, the graduated scale F, and cover L, for the purpose described and shown.

2. In a railroad car, the usual spring-beams, W S, inclosed by the rigid metal frame and retaining between them the car-springs, combined with the load-indicator composed of a rod attached to one beam and a pivotally-secured index-finger with a graduated scale applied to the other beam, the point of the rod being adapted to actuate the finger during the loading of the car, substantially as shown and described.

3. In a weight-indicator, the rod B, secured to one of the spring-beams, the combined index-finger and balanced lever C, secured to the other spring-beam, and the graduated scale F, the contact parts of the finger with the toe of the rod being a curved surface, whereby the finger is given a differential movement, this movement being greater along the graduated scale as the motion of the springs is proportionately decreased by compression, substantially as and for the purposes set forth.

4. In combination with the spring-beams of any vehicle constructed to carry or bear loads, the adjustable rod B, the index-finger C, retaining-spring R, the graduated scale F, and cover L, forming the load-indicator, as described and shown.

5. In combination with the spring-beams W S, the load-indicator composed of a rod attached to one beam and a pivotally-secured combined index-finger and balanced lever with a graduated scale applied to the other beam, the point of the rod being adapted to actuate the finger during the loading of the vehicle.

New York, February 15, 1887.

JAMES HOWARD.

Witnesses:
CHAS. C. GILL,
W. A. C. MATTHIE.